United States Patent
Haenen et al.

(10) Patent No.: US 7,357,548 B2
(45) Date of Patent: Apr. 15, 2008

(54) LIGHT-GUIDING SYSTEM COMPRISING A NUMBER OF LIGHT TRANSMISSION RODS

(75) Inventors: Ludovicus Johannes Lambertus Haenen, Eindhoven (NL); Johannes Petrus Maria Ansems, Eindhoven (NL); Nicola Bettina Pfeffer, Eindhoven (NL); Edwin Van Lier, Eindhoven (NL); Augustinus Gregorius Henricus Meijers, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 10/570,432

(22) PCT Filed: Aug. 19, 2004

(86) PCT No.: PCT/IB2004/051497

§ 371 (c)(1),
(2), (4) Date: Mar. 2, 2006

(87) PCT Pub. No.: WO2005/025149

PCT Pub. Date: Mar. 17, 2005

(65) Prior Publication Data
US 2006/0262561 A1    Nov. 23, 2006

(30) Foreign Application Priority Data

| Sep. 8, 2003 | (EP) | 03103314 |
| Sep. 8, 2003 | (EP) | 03103315 |
| Sep. 17, 2003 | (EP) | 03103423 |

(51) Int. Cl.
F21V 7/04 (2006.01)

(52) U.S. Cl. ............. 362/551; 362/511; 362/554; 362/555; 362/556; 362/558

(58) Field of Classification Search ............ 362/554, 362/556, 555, 558, 490, 493, 511, 551
See application file for complete search history.

(56) References Cited

U.S. PATENT DOCUMENTS

| 2,946,253 | A | | 7/1960 | Clark, Jr. |
| 5,021,928 | A | * | 6/1991 | Daniel .............. 362/556 |
| 5,101,325 | A | * | 3/1992 | Davenport et al. ...... 362/628 |
| 5,136,480 | A | * | 8/1992 | Pristash et al. ......... 362/618 |
| 5,301,090 | A | * | 4/1994 | Hed .................... 362/558 |
| 5,613,751 | A | * | 3/1997 | Parker et al. .......... 362/627 |
| 5,772,304 | A | | 6/1998 | Smith |
| 6,655,825 | B2 | * | 12/2003 | Muthu et al. .......... 362/561 |
| 7,056,000 | B2 | * | 6/2006 | Hussey et al. ......... 362/555 |
| 2002/0167820 | A1 | | 11/2002 | Haering et al. |
| 2003/0090909 | A1 | * | 5/2003 | Kalkbrenner ......... 362/554 |

(Continued)

FOREIGN PATENT DOCUMENTS

EP    0453092 A1    10/1991

(Continued)

*Primary Examiner*—Ali Alavi
*Assistant Examiner*—Evan Dzierzynski

(57) ABSTRACT

A light-guiding system comprising a plate-like light-guiding member (1) provided with a lateral surface for coupling in light into said light-guiding member (1). The ends of a number of light transmission rods (6) are connected to said lateral surface, while said light-guiding member (1) and said light transmission rods (6) are one piece of the same material.

14 Claims, 6 Drawing Sheets

U.S. PATENT DOCUMENTS

2004/0174715 A1* 9/2004 Page et al. .................. 362/554

FOREIGN PATENT DOCUMENTS

| EP | 0453092 | B1 | 10/1991 |
| EP | 0495273 | A1 | 7/1992 |
| JP | 05273414 | * | 10/1993 | ................. 362/551 |
| JP | 10283817 | A | 10/1998 |

* cited by examiner

LIGHT-GUIDING SYSTEM COMPRISING A NUMBER OF LIGHT TRANSMISSION RODS

The invention relates to a light-guiding system comprising a plate-like light-guiding member provided with a lateral surface for coupling in light into said light-guiding member.

Such a system is disclosed in US-A-2002/0167820. This publication describes a light-guiding system for improving the lighting conditions of the passenger compartment of a motor vehicle, whereby a plate-like light-guiding member is arranged in the area of the interior lining of the vehicle roof. Light is coupled in into the light-guiding member through one or more lateral surfaces of the light-guiding member, and light is emitted in a homogeneous manner into the passenger compartment of the vehicle through the large front surface of the light-guiding member.

Depending on the refractive index of the material of the light-guiding member, the light will be reflected back into the light-guiding member by the surfaces of said member when the surfaces are smooth and when the angle of incidence is greater than a certain value, i.e. the angle of total reflection. The angle of incidence is the angle between the light beam and a line perpendicular to the surface to which the light beam is directed.

Appropriate materials for guiding light are transparent thermoplastics, in particular polymethyl methacrylate (PMMA) or polycarbonate (PC). Such materials can be shaped, for example, by an injection molding process, by an extrusion process, or by a material-removing laser operation.

Light may be coupled in into the light-guiding member by means of a light-generating unit, such as a fluorescent tube, extending along the lateral surface of the light-guiding member. As an alternative, a number of light-emitting elements, such as light-emitting diodes (LEDs) may be arranged in a row along said lateral surface. However, in all these cases, only a portion of the light radiated by the light-generating unit will directly reach the lateral surface for coupling in the light into the light-guiding member. The use of a reflector behind the light-generating unit can increase the portion of the light radiation that reaches said lateral surface, but still there is much more light generated near said lateral surface than can be coupled in into the light-guiding member.

Furthermore, it is often desired that the directions of the light beams coupled in into the light-guiding member enclose relatively small angles with the direction perpendicular to said lateral surface. That will improve the guidance of the light in the light-guiding member. Special lenses may be used to achieve such a direction of the light beams.

The object of the invention is to provide a light-guiding system wherein light is coupled in through the lateral surface of a plate-like light-guiding member, wherein there is no loss of light near said lateral surface, and wherein the light beams of the light radiation can be easily directed at small angles to the direction perpendicular to said lateral surface.

In order to accomplish that objective, the ends of a number of light transmission rods are connected to said surface, said light-guiding member and said light transmission rods being one integral piece of the same material. The light transmission rods will guide light into said light-guiding member without any loss of light, because the light beams stay in the same light-guiding material and the light in the light transmission rods can easily be given directions at small angles to the longitudinal direction of the light transmission rod, so that the direction of the coupled-in light beams is substantially perpendicular to said lateral surface.

In one preferred embodiment, there are at least four, preferably more than eight, or many more light transmission rods positioned near said lateral surface, parallel to each other in a plane perpendicular to said lateral surface, such that the distance between the light transmission rods, near said surface, is preferably less than 5 mm, more preferably between 1 mm and 2 mm. Preferably, each light transmission rod has a diameter between 0.2 mm and 5 mm, more preferably between 1 mm and 3 mm. The light transmission rods may also be positioned in more parallel planes perpendicular to said lateral surface.

To achieve a convenient connection between the light transmission rods and the light-guiding member in which there is no transitional surface, the light transmission rods and the light-guiding member are of one and the same homogeneous piece of material. Preferably, said light-guiding member and the light transmission rods are produced by an injection molding operation, both being manufactured jointly in one operation.

In one preferred embodiment, at least a portion of a light transmission rod has a hexagonal or a square transverse section. Such a shape of the light transmission rods makes it possible to combine a number of light transmission rods into a bundle without deforming the rods and without space between the rods. The light transmission rods can be easily bound together without heating as a result of this.

The transverse section of the light transmission rods may also vary along its length, i.e. in one preferred embodiment at least a portion of a light transmission rod has an increasing diameter in a direction towards the light-guiding member. The light beams will thus become more and more parallel when passing through the light transmission rod. Such an increase of the diameter is preferably applied near the light-guiding member to which the rods are connected, the diameter of the light transmission rods near said member being preferably more than 1.5 times, more preferably more than twice, the diameter further away from said light-guiding member. Such an increasing diameter can be easily produced in the injection molding manufacturing process of the light transmission rods.

In one preferred embodiment, the other ends of the light transmission rods are bound together so as to form a member for coupling in light into said light transmission rods. Such a member may have a substantially cylindrical shape, a rectangular shape, or any other shape. The light transmission rods may also be bound together into more than one member. The end surfaces of the bound-together light transmission rods can be placed in front of a lamp or other light source, a reflector behind the lamp providing a light radiation comprising substantially parallel light beams, so that there are relatively small angles between the direction of the light radiation in the light transmission rods and the longitudinal direction of these rods.

In one preferred embodiment, said plate-like light-guiding member is provided with means for emitting light through at least part of its front surface, i.e. its large surface substantially perpendicular to said lateral surface. Such an emission of light may be obtained by roughening of said front surface or the rear surface of the light-guiding member as described in US-A-2002/0167820.

In another embodiment, said light-guiding member has a substantially flat plate-like and triangular shape, wherein a shorter side of the triangle comprises the lateral surface for coupling in light into said light-guiding member, wherein a longer side of the triangle comprises a coupling-out surface which may face a surface of a light-guiding element for coupling in light into this light-guiding element, and wherein the third side of the triangle comprises a number of surfaces that are positioned at an angle to the direction of said third side, all said surfaces being perpendicular to the plane of said plate-like shape, while said light transmission rods are connected to said lateral surface.

Preferably, the plate-like light-guiding member has a substantially right-angled triangular shape, wherein said shorter side and said longer side of the triangle enclose the substantially right angle, and wherein said third side is the hypotenuse of the triangle, which side comprises said number of surfaces, said surfaces being positioned at an angle of about 45° to said coupling out surface.

Preferably, said third side comprises a number of surfaces having alternating directions, at said angle to the direction of said third side and substantially perpendicular to said shorter side.

In this embodiment, the light-guiding member functions as an intermediate optical waveguide, in which the shorter side of the triangle can be made as short as is required to make use of an appropriate number of light transmission rods, and the longer side may have a length corresponding to the length of the oblong lateral surface of the plate-like light-guiding element. The number of surfaces at a certain angle along said third side of the triangle is preferably more than six, more preferably more than twelve.

In one preferred embodiment, at least said surfaces having a direction at an angle to the direction of said third side are provided with a light-reflecting material. All surfaces of the light-guiding member, except for the coupling-out surface, may be provided with a light-reflecting coating to increase the reflection of light if the surface is not smooth enough to reflect all light having an angle of incidence greater than the angle of total reflection, or if there are light beams having an angle of incidence smaller than the angle of total reflection. Such a coating may also protect the relevant surfaces from undesired optical contact with other materials.

Preferably, the light-guiding member has a thickness between 0.5 mm and 15 mm, more preferably between 2 mm and 7 mm. thickness of said light-guiding element, if present.

In one preferred embodiment, said light-guiding element has a plate-like shape and is provided with means for emitting light through the front side of the plate, said light transmission rods, said light-guiding member, and said light-guiding element being one piece of the same material, while an interstice extending over a major portion of the coupling-out surface of the light-guiding member is present between said light-guiding member and said light-guiding element. The interstice forms two mutually facing and substantially parallel surfaces with air in-between, so that only light beams having a smaller angle of incidence than the angle of total reflection can pass the interstice. There may be more interstices extending in the same plane with relatively small areas between the interstices where the light-guiding member and the light-guiding element are interconnected. The interstices may be produced during the injection molding operation or may be made afterwards, for example by a material-removing operation with a laser beam.

Preferably, surfaces of the light-guiding member and/or the light-guiding element and/or the light transmission rods are provided with a coating having a lower refractive index than the material of said member, element, or rods, respectively. Such a coating, or cladding, prevents the surface of the light-guiding material from being contacted by material or becoming contaminated, for example by fingerprints, with material having the same or a higher refractive index making optical contact with the surface of the light-guiding material, resulting in undesired coupling-out of light.

For example, such a cladding makes it possible to attach a fabric against the front surface of the light-guiding element by means of glue, so that the light can shine through the fabric. Furthermore, the light-guiding element may be fixed by means of glue while being mounted.

The whole combination of the light-guiding member and the light-guiding element and the light transmission rods can be made by one injection molding operation, so that the assembly containing all light-guiding means is one piece of the same material. The light can thus be guided from the light source to the location of emission without losses.

The invention also relates to a method of guiding light by means of a light-guiding system comprising a plate-like light-guiding member provided with a lateral surface for coupling in light into said light-guiding member, wherein light is coupled in through a number of light transmission rods, wherein the ends of the light transmission rods are connected to said lateral surface, and wherein said light-guiding member and said light transmission rods are one piece of the same material.

The invention will now be further elucidated by means of a description of some embodiments of a light-guiding system, wherein reference is made to the drawing comprising Figures which are only schematic representations, in which.

Figure 1:
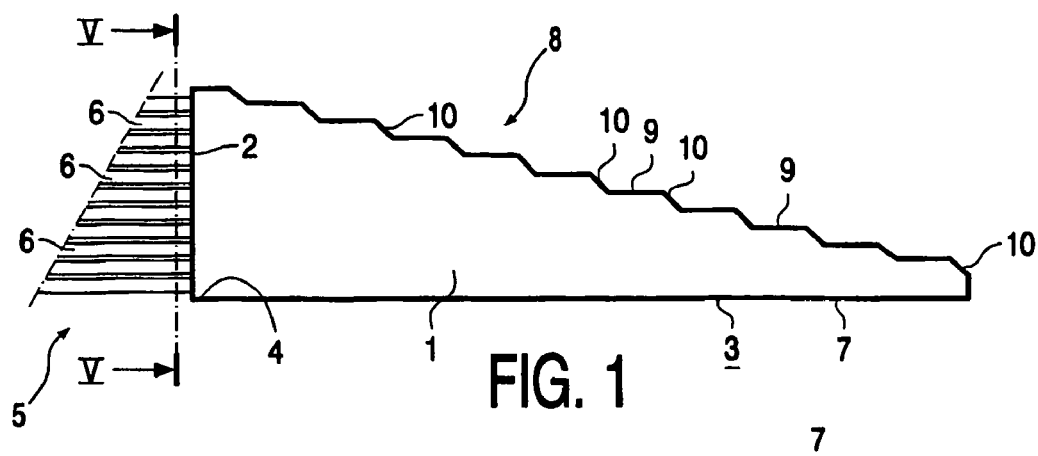
FIG. 1 is a plan view of a plate-like triangular light-guiding member.

FIG. 1 shows a plate-like and substantially triangular light-guiding member 1. In this example of an embodiment, the material of the light-guiding member 1 is polycarbonate, which is a transparent thermoplastic material that can be shaped by means of an injection molding operation. The outer surfaces of the product that is produced by the injection molding operation are smooth, so that light that is coupled in will be reflected by said surfaces, provided that the angle of incidence with respect to the relevant surface is greater than the angle of total reflection (i.e. the critical angle of total reflection). The angle of total reflection depends on the value of the refractive index of the material of the light-guiding member and the value of the refractive index of the medium bordering the relevant surface of the light-guiding member.

The refractive index of polycarbonate is about 1.6 and the refractive index of air is about 1, so the angle of total refraction is about 39°. That means that all light beams having an angle of incidence above 39° with respect to the relevant surface of the light-guiding member 1 will be totally reflected back into the material of the light-guiding member 1. Only a light beam having an angle of incidence smaller than 39° will be coupled out.

In this embodiment, the light-guiding member 1 has, in plan view, a substantially right-angled triangular shape, a shorter side 2 and a longer side 3 of the triangle enclosing the substantially right angle 4. In the embodiment shown, the thickness of the plate-like light-guiding member 1 is about 6 mm.

The shorter side 2 is provided with light-coupling means 5 for coupling in light into the light-guiding member 1. The light-coupling means 5 comprise a number of light transmission rods 6 that are positioned parallel to each other in a plane parallel to the plane of the plate-like shape of the light-guiding member 1, at least near this member 1. The light transmission rods 6 and the light-guiding member 1 are produced in one injection molding operation, and therefore they are one integral piece of the same material. FIG. 1 only shows eleven light transmission rods 6, but in practice there may be many more light transmission rods connected to the light-guiding member 1. The light transmission rods 6 may also be located in two of more different parallel planes.

Figure 2:
FIG. 2 is a side elevation of the light-guiding member viewed from the lower side in FIG. 1.

The longer side 3 comprises a coupling-out surface 7 positioned perpendicularly to the plane of the plate-like light-guiding member 1. FIG. 2 shows the coupling-out surface 7 in front view. Light will be coupled out from the light-guiding member 1 if the light beams have an angle of incidence with respect to the coupling-out surface 7 of less than 39°, this being the angle of total reflection in the described embodiment.

Figure 3:
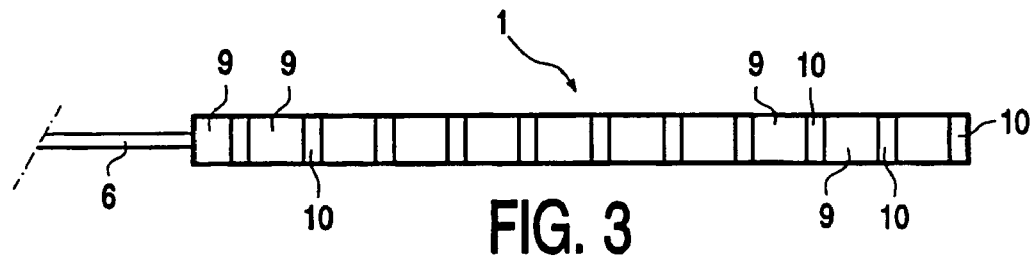
FIG. 3 is a side elevation of the light-guiding member viewed from the upper side in FIG. 1.
Figure 4:
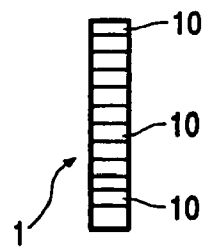
FIG. 4 is a side elevation of the light-guiding member viewed from the right-hand side in FIG. 1.

The third side of the triangular shape of the light-guiding member 1, the hypotenuse 8, comprises a number of surfaces 9, 10 having alternating directions. All surfaces 9 are positioned parallel to the coupling-out surface 7 and all surfaces 10 are positioned at an angle of 45° to the coupling-out surface 7. The surfaces 9,10 are positioned perpendicularly to the plane of said plate-like shape. FIGS. 3 and 4 show the row of surfaces 9 and 10 with alternating directions.

Figure 5:
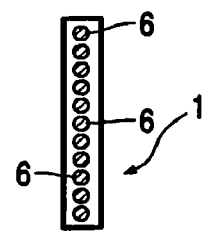
FIG. 5 is a sectional view taken on the line V-V in FIG. 1.

FIG. 5 is a sectional view taken on the line V-V of FIG. 1 and shows the light transmission rods 6 in sectional view. A light transmission rod is also called a light transmission tube. However, it is not a "tube" (i.e. a hollow body), but for light it is in fact a tube because the light is propagated in the material of the tube and is reflected against the outer surface of it, so it stays in the tube or rod 6.

The light transmission rod 6 may have a round transverse section, so that its shape is cylindrical. However, other shapes of the transverse section are possible, for example a hexagonal or a square shape, in order to facilitate the creation of a bundle without space between the light transmission rods 6.

The transverse section of the light transmission rods 6 may also vary along its length, i.e. in one preferred embodiment at least a portion of a light transmission rod 6 has an increasing diameter in a direction towards the light-guiding member 1. The light beams will thus become more and more parallel when passing through the light transmission rod.

Such an increase of the diameter is preferably applied near the light-guiding member 1 to which the rods 6 are connected, the diameter of the light transmission rods 6 near said member 1 being preferably more than 1.5 times, more preferably more than twice the diameter further away from said light-guiding member. Such an increasing diameter can be easily produced by an injection molding operation of the light transmission rods 6.

By means of the light-guiding member 1, light can be coupled in through a relatively small (short) area at the shorter side 2 and can be coupled out through a relatively large (long) area, i.e. the coupling out surface 7, at the longer side 3. Depending on the manner of coupling in of the light into the light transmission rods 6, the direction of the radiation can be given a very small angle to said longitudinal direction. Therefore, the radiation of the coupled-in light entering the light-guiding member 1 through the light transmission rods 6 has a small angle to the longitudinal direction of the light transmission rods 6 and is therefore directed substantially parallel to the coupling-out surface 7.

So, the light enters the light-guiding member 1 mainly with a direction parallel to the coupling-out surface 7. Therefore, almost all coupled in light will hit one of the surfaces 10 at an angle of incidence of about 45°. Since this angle is much greater than the angle of total reflection (being about 39°), most of the light will be reflected in a direction substantially perpendicular to the coupling-out surface 7, or with a relatively small deviation from that direction. All light having an angle of incidence smaller than 39° will be coupled-out through the coupling out surface 7, apart from some small losses of light caused by the passage through the surface 7.

The light-guiding member 1 functions as an intermediate optical waveguide, in which the shorter side 2 of the triangle may be made as short as is required to make use of appropriate light-coupling means 5 and the longer side 3 may have a length corresponding to the length of the oblong lateral surface of a plate-like light-guiding element. The number of surfaces 9, 10 along the hypotenuse 8 of the triangle can be as large as is required to achieve an appropriate reflection and distribution of the light.

If the angle of total reflection is greater than in this embodiment because of the use of other materials or another surrounding medium, or if reflection is disturbed by a less smooth surface, the surfaces 10 and/or also other surfaces of the light-guiding member, may be provided with a light-reflecting material. Such a material, or coating, may also protect the relevant surfaces from undesired optical contact with other materials.

Instead of a reflecting coating, a reflecting mirror may be mounted at some distance to the relevant surface, for example surface 10. There are also high-reflection tapes available that can be attached to the surface in order to provide a full reflection of the light back into the material of the light-guiding member 1.

Furthermore, the two parallel surfaces of the light-guiding member (the front surface and the rear surface) may be provided with a coating of material having a lower refractive index than the material of the light-guiding member 1 itself. Such a coating, or cladding, prevents the surface of the light-guiding material from being contacted by material or becoming contaminated, for example by fingerprints, with material having the same or a higher refractive index making optical contact with the surface of the light-guiding material, whereby light can be coupled out unintentionally.

Figure 6:
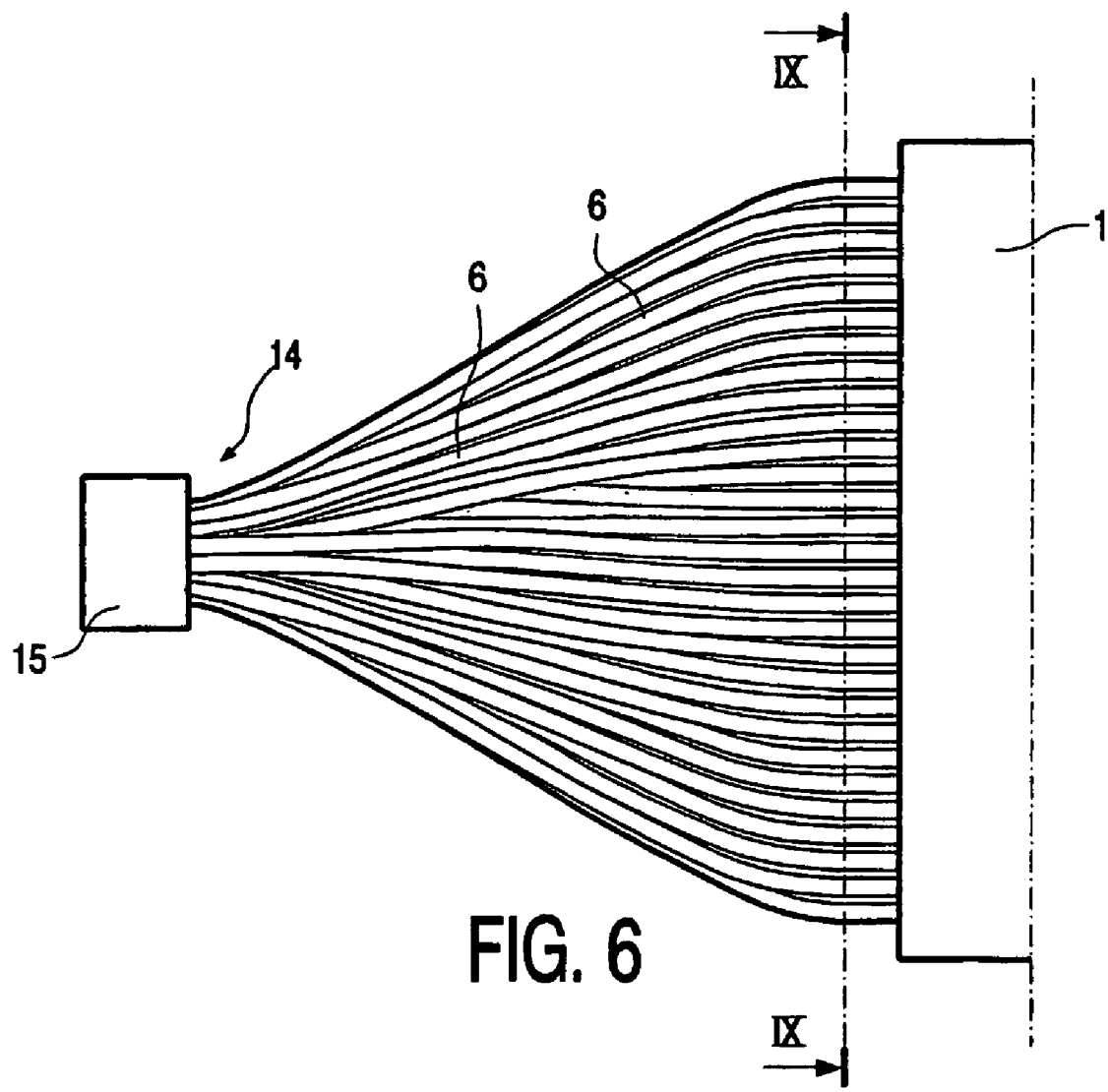
FIG. 6 is a plan view of a optical waveguide comprising light transmission rods.
Figure 7:
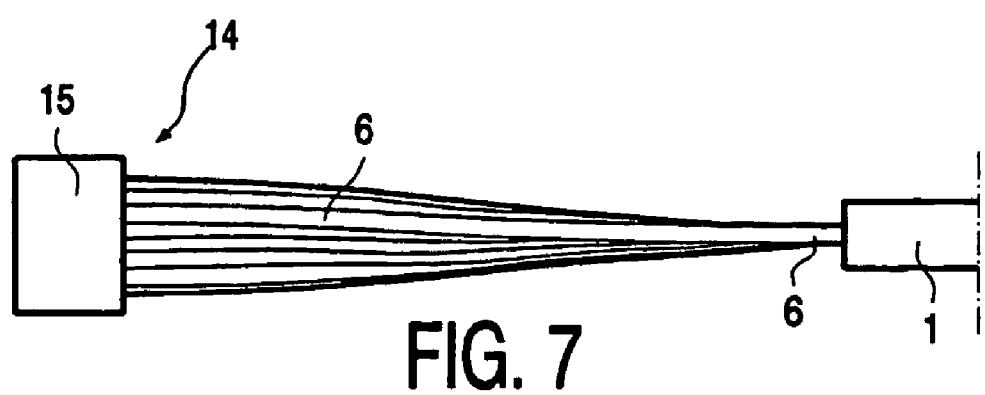
FIG. 7 is a side elevation of the optical waveguide viewed from the lower side in FIG. 6.
Figure 8:
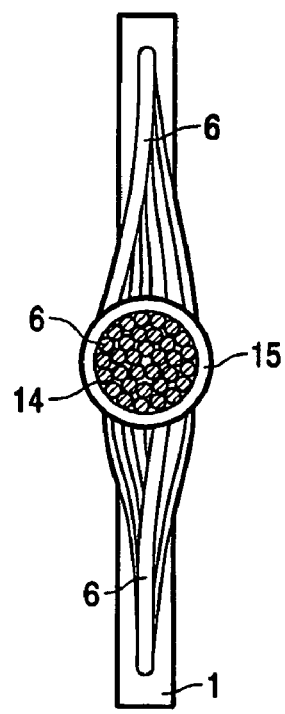
FIG. 8 is a side elevation of the optical waveguide viewed from the left-hand side in FIG. 6.
Figure 9:
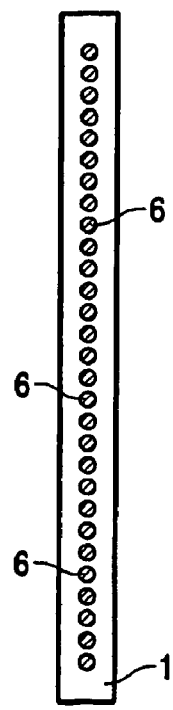
FIG. 9 is a sectional view taken on the line IX-IX in FIG. 6.

FIGS. 6, 7 and 8 show a number of light transmission rods 6 and a portion of the plate-like light-guiding member 1 to which the light transmission rods 6 are connected. Near the light-guiding member 1, the light transmission rods 6 are parallel and positioned in a flat plane, as is shown in FIG. 9, which is a sectional view taken on the line IX-IX in FIG. 6. Further away from the light-guiding member 1, the light transmission rods 6 are positioned closer to each other, and at the end all light transmission rods 6 have become a bundle 14 of parallel rods 6 surrounded by a cylindrical holder 15.

In order to transport light to the light-guiding member 1 through the light transmission rods 6, light has to be coupled in into the light transmission rods 6 at the other ends of these rods 6, i.e. the ends that are not connected to the light-guiding member 1. These ends are present in the cylindrical holder 15. To couple in light, the holder 15 may be placed in front of a lamp or other light source, which is not shown in the drawing. A reflector behind the lamp or a lens in front of the lamp can provide light with substantially parallel radiation, which can be directed to the cylindrical holder 15, so that the light in each light transmission rod 6 has substantially a direction corresponding to the longitudinal direction of the respective light transmission rod 6. The light will thus enter the light-guiding member 1 mainly in one direction. If the light-guiding member 1 is a member as shown in FIGS. 1-5, said direction of the light radiation is advantageously as described above. If the light-guiding member 1 is a plate-like waveguide for other purposes, however, for example for emitting light through its front side as will be described below, it is also advantageous to have the light radiation mainly parallel and perpendicular to a lateral surface of the plate like light-guiding member. The light will then be effectively distributed in the light-guiding member and will easily reach locations far away from said lateral surface.

The light transmission rods 6 may have a round transverse section, as is shown in the Figures. However, it may be advantageous to provide the light transmission rods 6 with someother transverse sectional shape, for example a hexagonal shape or a square shape. Then the rods 6 can be easily bound together into a bundle without any space between them. In the case of round rods 6, ends of the rods may be heated while being pressed together in order to eliminate spaces between the rods in the cylindrical holder 15. The rods 6 may even be fused (melted) together in the holder 15. However, any space between the light transmission rods 6 in the holder 15 does not disturb the coupling-in of light into the light transmission rods 6, but there may be more losses of light in that case.

In the embodiment described, the holder 15 has a cylindrical shape. However, the holder may also have another shape, for example a rectangular shape should such a shape correspond better to the shape of the light source. The light transmission rods 6 may also be divided over more bundles 14, i.e. more holders 15, in which case the ends of the bundles are located in front of different light sources.

In one preferred embodiment not shown in the Figures, the diameter of the rods varies over its length, such that the diameter increases in a direction away from the light-guiding member 1. As was noted above, such a shape improves the transmission of light in that the transmitted light beams are directed more and more parallel to each other during their transmission.

The light transmission rods 6 may have a diameter between 0.2 mm and 5 mm, preferably between 1 mm and 3 mm, and the distance between the rods 6, near the light-guiding member 1, may be between 0.5 mm and 2 mm. The number of light transmission rods 6 may be high, depending on the requirements. The length of a light transmission rod 6 may also depend on the requirements. In general, the lengths of the light transmission rods 6 are different, to enable each of them to bridge the distance between the lateral surface of the light-guiding member 1 and the cylindrical holder 15 in an appropriate way. This distance may be short if the cylindrical holder 15 with the light source is located near the light transmission member 1, but it is also possible to place the light source and the cylindrical holder 15 far away from the light-guiding member 1, with the light transmission rods 6 arranged in a bundle running from the cylindrical holder 15 to a location near the light-guiding member 1, where the light transmission rods 6 diverge to their individual locations at the lateral surface of light-guiding member 1.

The light transmission rods 6 as well as the light-guiding member 1 to which the rods 6 are connected are manufactured in an injection molding operation. The two parts 1,6 are made together therein, so that they are one piece of material, being polycarbonate in this example of an embodiment, which material allows sufficient flexibility for the light transmission rods 6. The light can thus be guided without any interruption from the light source at a distance from the light-guiding member 1 to said plate-like light-guiding member 1, where its entrance is distributed over the entire lateral surface of the light-guiding member 1, the radiation of the light being directed substantially perpendicularly to said lateral surface.

Said other ends of the light transmission rods 6 are formed into a bundle 14 and surrounded by the holder 15 after the light transmission rods 6, together with the light-guiding member 1, have been produced in an injection molding operation. The holder 15 may be a metal or plastic cylinder into which the bundle 14 of light transmission rods 6 is introduced, it may alternatively comprise two 'half pipes' which are joined together around the bundle 14. As an alternative, the holder 15 may consist of tape wound around the bundle 14 of light transmission rods 6.

Figure 10:
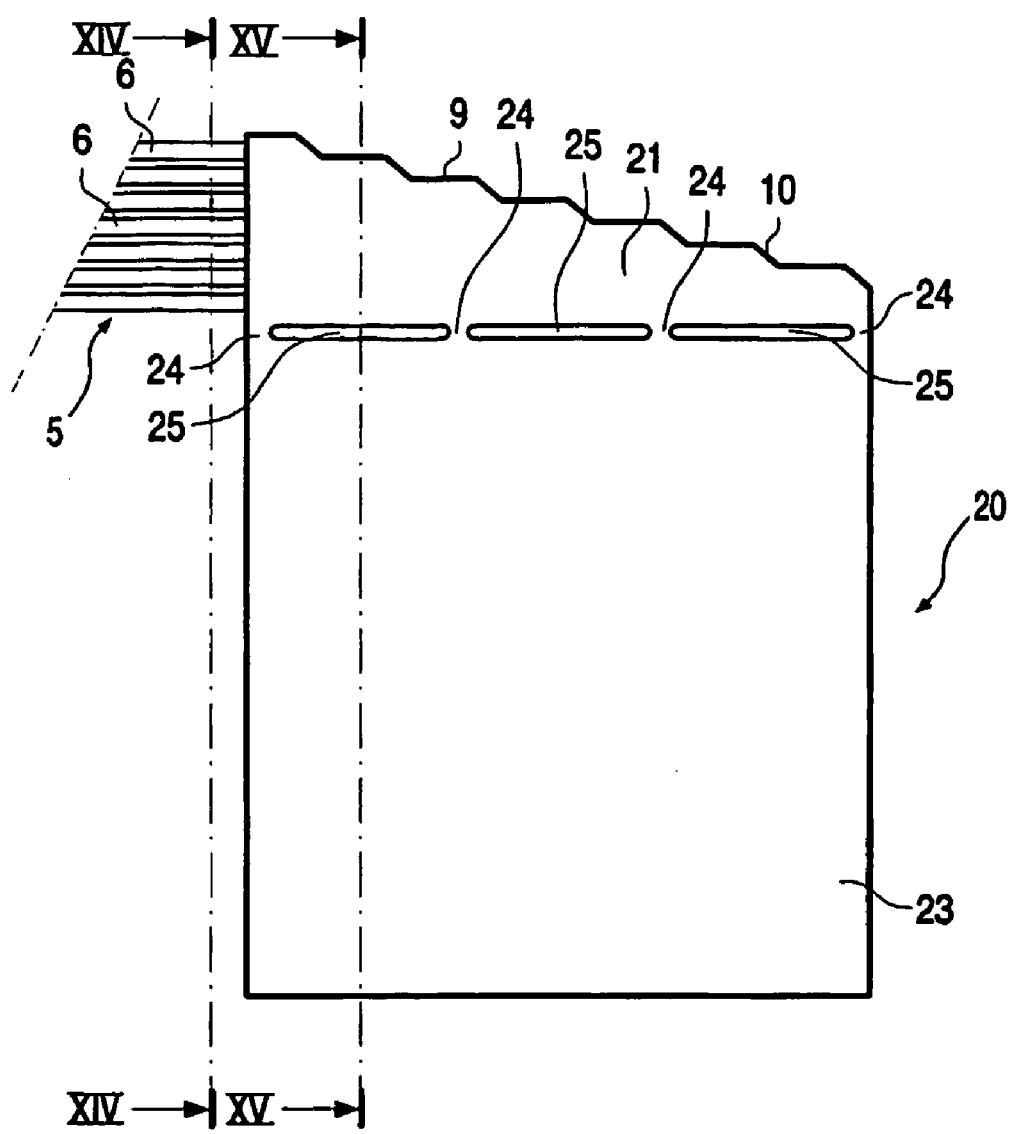
FIG. 10 is a plan view of a system for guiding and emitting light.

FIG. 10 shows an embodiment of a light-guiding system comprising a rectangular plate-like light-emitting element 20 and a substantially triangular plate-like light-guiding member 21, similar to the light-guiding member 1 described above, for which reference is made to FIGS. 1-5.

Figure 11:
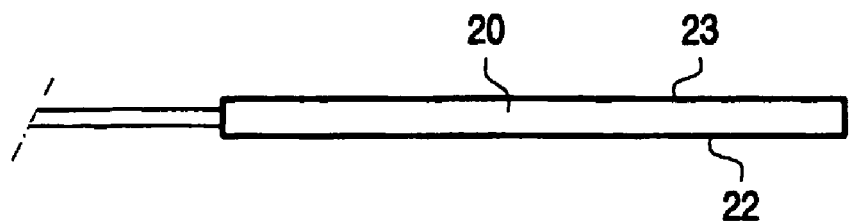
FIG. 11 is a side elevation of the system viewed from the lower side in FIG. 10.
Figure 12:
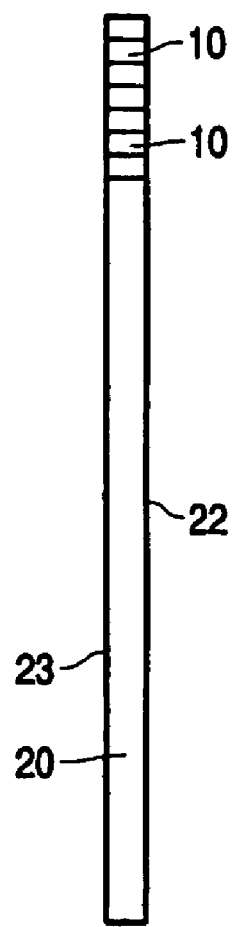
FIG. 12 is a side elevation of the system viewed from the right-hand side in FIG. 10.
Figure 13:
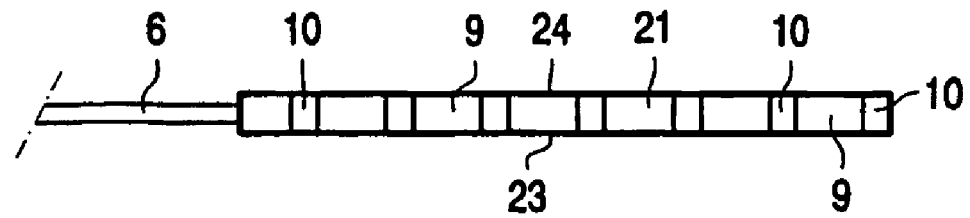
FIG. 13 is a side elevation of the system viewed from the upper side in FIG. 10.
Figure 14:
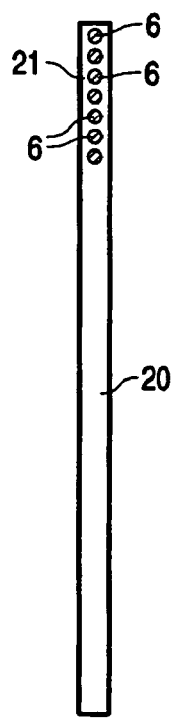
FIG. 14 is a sectional view taken on the line XIV-XIV in FIG. 10.
Figure 15:
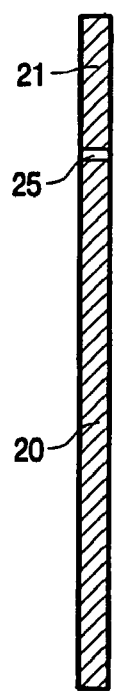
FIG. 15 is a sectional view taken on the line XV-XV in FIG. 10.

According to FIGS. 11-13 (side elevations) and FIGS. 14-15 (sectional views), the plate-like light-emitting element 20 and the light-guiding member 21 are flat, but they may also be curved, resulting in a two-or three-dimensional curved shape. Such a shape may, for example, correspond to the shape of a vehicle roof or a part thereof to which the light-guiding system is to be mounted. If there are only relatively weak curves in the plate-like shape, the light will not be coupled out because of the curves.

Light is coupled out through front surface 22 of light-emitting element 20. To achieve such light emission, radiation of light inside the element 20 is given a direction corresponding to an angle of incidence towards the front surface of less than the angle of total reflection. In order to obtain such a direction of light radiation, the rear surface 23 or the front surface 22 may have, at least locally, a certain structure obtained by roughening, embossing or boring of the surface of the material. Another possibility is the introduction of scattering centers, such as refractive pigments, in the material of the light-emitting element 20. Anyway, such means for coupling out light are known per se. The rear surface 23 of the light-emitting element 20 may be coated with light-reflecting material to prevent light radiation through said rear surface 23. It is also possible to mount a mirror at some distance from the rear surface 23, so that light is reflected back into the light-emitting element 20.

In the embodiment shown in FIG. 10, the light-emitting element 20 and the light-guiding member 21 are connected to each other in four locations 24. Between these locations 24 there are three interstices 25 which cover a major portion of the area between the light-emitting element 20 and the light-guiding member 21. Although an interstice 25 may extend over a portion of the distance between the front surface 22 and the back surface 23, so that one of the surfaces 22,23 is uninterrupted, the interstices 25 in the embodiment shown extend over the entire thickness of the light-emitting element 20 and light-guiding member 21, as is clearly shown in FIG. 15. The width of the interstices in this embodiment is about 1 mm. Preferably, the width of the interstices is between 0.05 and 0,15 times the thickness of the light-guiding member 1.

The light-emitting element 20 and the light-guiding member 21 and the light transmission rods 6 are one piece of the same material, in this embodiment polycarbonate, manufactured in one injection molding operation. The interstices 25 are also formed during that injection molding process. However, the interstices 25 may alternatively be made afterwards, for example by a material-removing operation with a laser beam.

As described above with reference to the substantially triangular light-guiding member 1, the light enters the light-guiding member 21 through the light transmission rods 6, the direction of the light radiation being mainly parallel to the longitudinal direction of the rods 6. Then the light is reflected by the surfaces 10 and sent in the direction of the light-emitting element 20, during which most of the light radiation has a direction substantially perpendicular to the interstices 25. This light will cross the interstices 25 with small losses because it passes both surfaces of the interstice 25. However, light radiation having a direction with a large angle to a line perpendicular to the interstice 25 will not cross the interstice 25, but will be reflected back into the material of the light-guiding member 21. This light radiation can only cross the interstice 25 after being reflected in the light-guiding member 21 once or several times, until its direction allows the passage through the interstice 25.

Owing to the interstices 25, therefore, the light coupled into the light-emitting element 21 has a direction whereby it can easily reach locations at a relatively large distance to the surface where the light enters the light-emitting element 20. This improves the distribution of the light emission over the front surface 22 of the light-emitting element 20.

Furthermore, the presence of the interstices 25 improves the guidance of light from the light transmission rods 6 to the surface 10 on the right-hand side of FIG. 10, i.e. far away from the rods 6. If a light beam from a lower (in FIG. 10) light transmission rod 6 diverges downwards, it will be reflected by the surface of the interstice 25 and be directed to the surface 10 on the right-hand side of FIG. 10.

The light-guiding member 21 and/or the light-emitting element 20 and/or the light transmission rods 6 may be provided with a coating having a lower refractive index than the material of said member 21, element 20, or rods 6, respectively. Such a coating, or cladding, prevents the surface of the light-guiding material from being contacted by material or becoming contaminated, for example by fingerprints, with material having the same or a higher refractive index making optical contact with the surface of the light-guiding material, resulting in undesired coupling-out of light. For example, such a cladding makes it possible to attach a fabric against the front surface of the light-emitting element by means of glue, such that the light can shine through the fabric. The cladding also allows the fixation of the light-guiding system by means of glue.

The embodiments described above are merely examples of the light-guiding system; a great many other embodiments are possible.

The invention claimed is:

1. A light-guiding system comprising a plate-like light-guiding member provided with a lateral surface for coupling in light into said light-guiding member, characterized in that the ends of a number of light transmission rods are connected to said lateral surface, said light-guiding member and said light transmission rods being one integral piece of the same material,
    wherein said light-guiding member has a substantially flat plate-like and triangular shape, wherein a first side of the triangle comprises the lateral surface for coupling in light into said light-guiding member, wherein a second side of the triangle comprises a coupling-out surface which faces a surface of a light-emitting element for coupling in light into said light-emitting element, and wherein the third side of the triangle comprises a number of surfaces that are positioned at an angle to the direction of said third side, all said surfaces being perpendicular to the plane of said plate-like shape,
    further wherein said light-emitting element has a plate-like shape and is provided with means for emitting light through a front side of the plate-like shape, and
    wherein said light transmission rods, said light-guiding member, and said light-emitting element are one integral piece of the same material, and further comprising:
    one or more interstices extending lengthwise over a major portion of the coupling-out surface of said light-guiding member between said light-guiding member and said light-emitting element.

2. A light-guiding system as claimed in claim 1, characterized in that, near said lateral surface, the light transmission rods are positioned parallel to each other in a plane perpendicular to said lateral surface.

3. A light-guiding system as claimed in claim 1, characterized in that the distance between the light transmission rods, near said lateral surface, is less than 5 mm.

4. A light-guiding system as claimed in claim 1, characterized in that the light transmission rods have a diameter between 0.2 mm and 5 mm.

5. A light-guiding system as claimed in claim 1, characterized in that said light-guiding member and the light transmission rods are produced by an injection molding process.

6. A light-guiding system as claimed in claim 1, characterized in that at least a portion of a light transmission rod has a hexagonal or a square transverse section.

7. A light-guiding system as claimed in claim 1, characterized in that at least a portion of a light transmission rod has a diameter that increases in a direction towards the light-guiding member.

8. A light-guiding system as claimed in claim 1, characterized in that the other ends of the light transmission rods are bound together so as to form a member for coupling in light into said light transmission rods.

9. A light-guiding system as claimed in claim 1, characterized in that said light-guiding member is provided with means for emitting light through at least part of its front surface.

10. A light-guiding system as claimed in claim 1, characterized in that surfaces of the light-guiding member and/or the light-emitting element and/or the light transmission rods are provided with a coating having a lower refractive index than the material of said member, element, or rods, respectively.

11. A light-guiding system as claimed in claim 1, characterized in that the distance between the light transmission rods, near said lateral surface, is between 1 mm and 2 mm.

12. A light-guiding system as claimed in claim 1, characterized in that the light transmission rods have a diameter between 1 mm and 3 mm.

13. A light-guiding system as claimed in claim 1, characterized in that the one or more interstices have a width between 0.05 and 0.15 times the thickness of the light-guiding member.

14. A method of guiding light by means of a light-guiding system comprising a plate-like light-guiding member provided with a lateral surface for coupling in light into said light-guiding member, characterized in that light is coupled in through a number of light transmission rods, wherein the ends of the light transmission rods are connected to said lateral surface, and wherein said light-guiding member and said light transmission rods are one integral piece of the same material, wherein said light-guiding member has a substantially flat plate-like and triangular shape, wherein a first side of the triangle comprises the lateral surface for coupling in light into said light-guiding member, wherein a second side of the triangle comprises a coupling-out surface which faces a surface of a light-emitting element for coupling in light into said light-emitting element, and wherein the third side of the triangle comprises a number of surfaces that are positioned at an angle to the direction of said third side, all said surfaces being perpendicular to the plane of said plate-like shape, further wherein said light-emitting element has a plate-like shape and is provided with means for emitting light through a front side of the plate-like shape, and wherein said light transmission rods, said light-guiding member, and said light-emitting element are one integral piece of the same material, and further comprising:

one or more interstices extending lengthwise over a major portion of the coupling-out surface of said light-guiding member between said light-guiding member and said light-emitting element.

\* \* \* \* \*